UNITED STATES PATENT OFFICE.

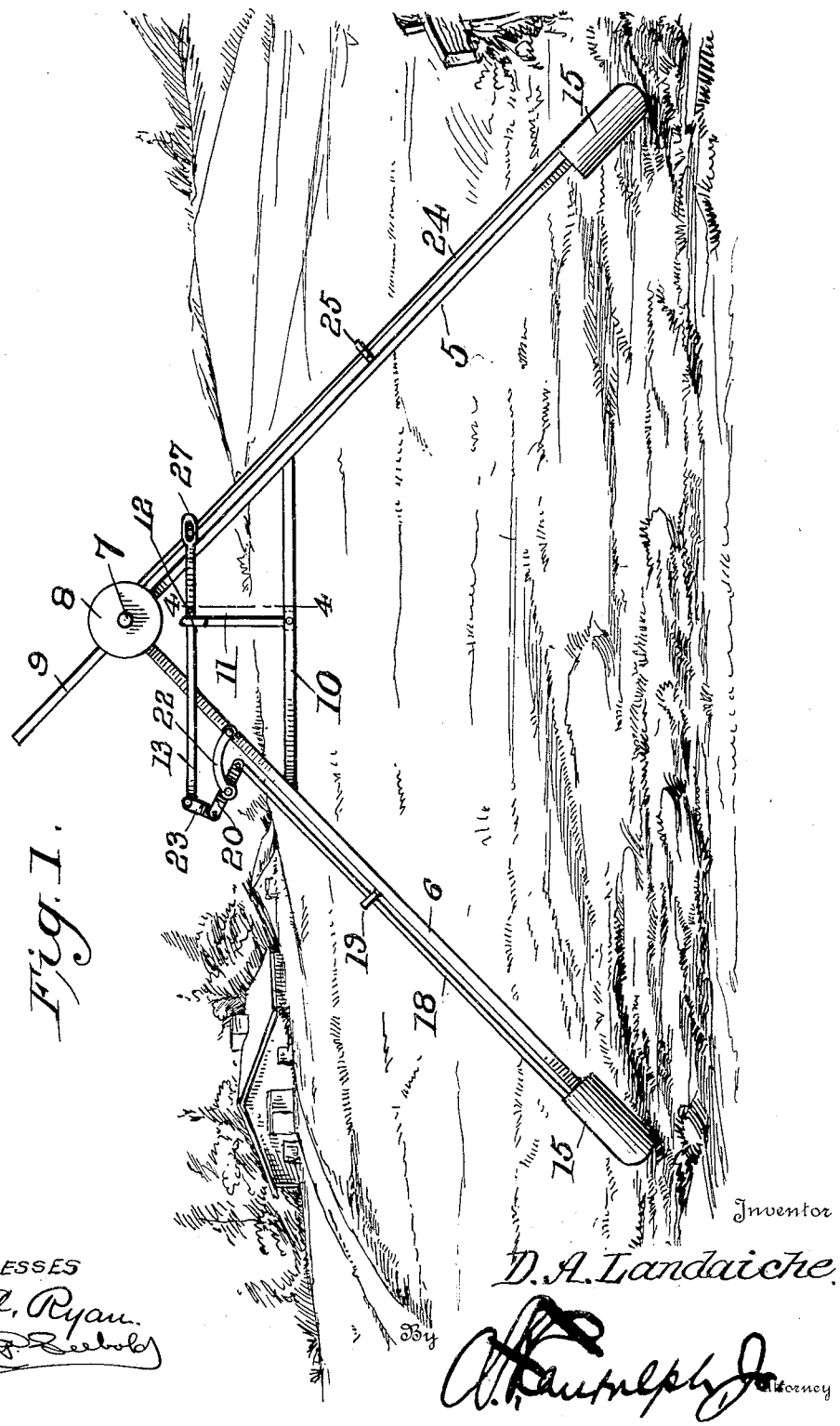

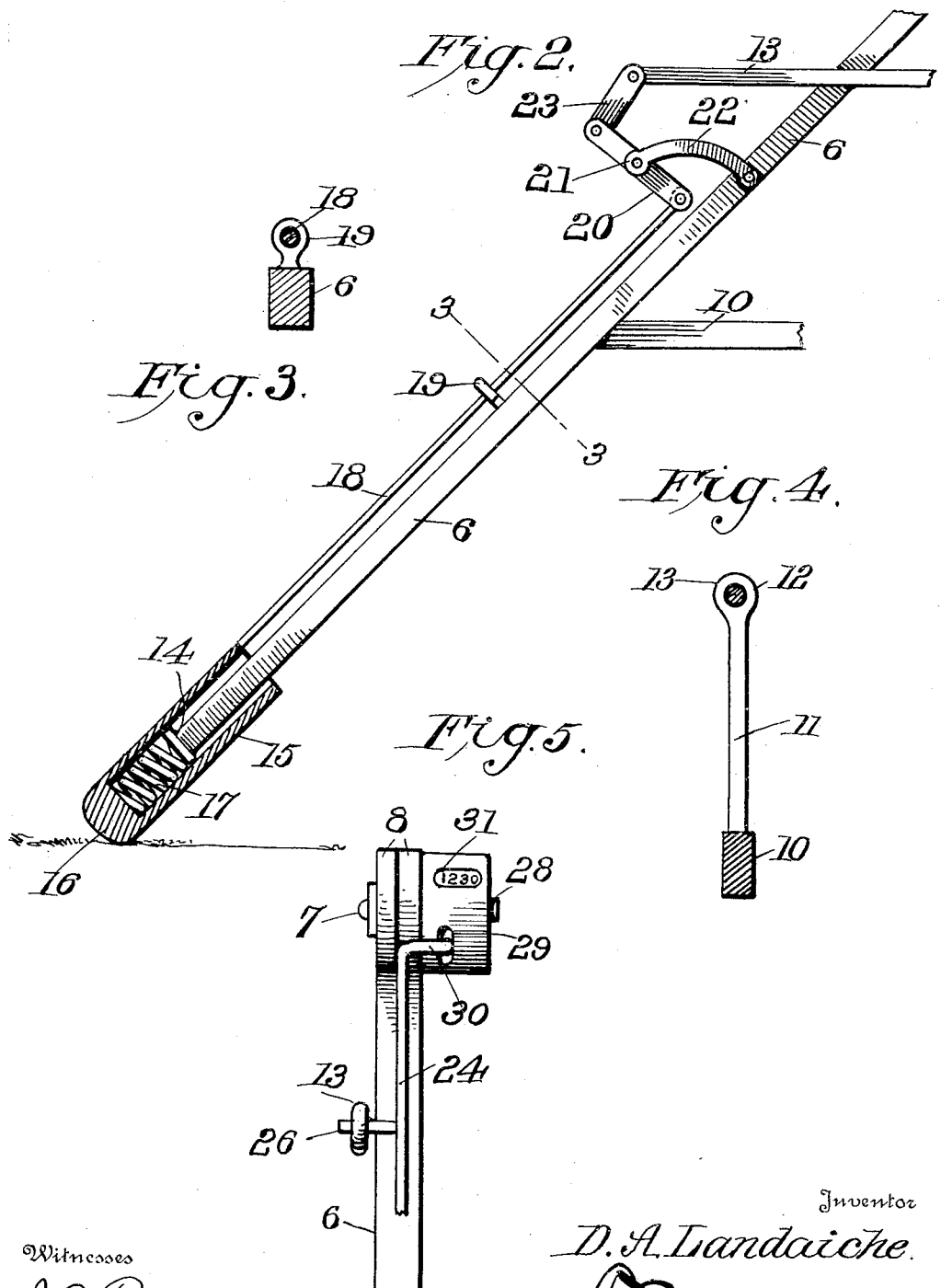

DIDIER A. LANDAICHE, OF THIBODAUX, LOUISIANA.

REGISTERING MEASURING INSTRUMENT.

1,117,064.  Specification of Letters Patent.  Patented Nov. 10, 1914.

Application filed June 23, 1914. Serial No. 846,810.

*To all whom it may concern:*

Be it known that I, DIDIER AUGUSTIN LANDAICHE, a citizen of the United States, residing at Thibodaux, in the parish of Lafourche and State of Louisiana, have invented certain new and useful Improvements in Registering Measuring Instruments, of which the following is a specification.

This invention has for its object to provide a measuring instrument including a pair of angularly directed arms, the free ends of which are permanently spaced a predetermined distance apart, and means for registering the number of operations of the instrument in measuring the distance between two points.

With this and other objects in view, the invention consists in the novel construction, arrangement and formation of parts, as will be hereinafter specifically described, claimed and illustrated in the accompanying, in which:

Figure 1 represents a side elevation of the measuring instrument applied for use. Fig. 2 represents an enlarged fragmental view, partly in section, of one of the arms of the instrument. Fig. 3 represents a transverse sectional view on the line 3—3 of Fig. 2. Fig. 4 represents a vertical sectional view, partly broken away, on the line 4—4 of Fig. 1, and Fig. 5 represents an edge elevation of the upper part of the instrument, showing the registering attachment.

Referring to the drawing in detail, wherein similar reference numerals designate corresponding parts throughout the several views, the numerals 5 and 6 indicate the arms or legs of the instrument which are directed substantially at right angles to each other and connected at their adjacent ends by a bolt or equivalent securing means 7 extending through the heads 8. A handle 9 is rigidly secured to one of the heads 8 for conveniently handling the instrument. A brace 10 is secured between the arms 5 and 6 adjacent the connected ends of the latter and carries a post 11 having an eye 12 in the upper end thereof receiving the horizontally disposed bar 13 having pivotal and sliding movement in said eye. The feet 14 of the legs 5 and 6 are slidably mounted within the upper open ends of the cylindrical members 15 having enlarged ground engaging ends 16. Springs 17 are disposed within the cylindrical members 15 between the enlarged ends 16 thereof and the feet 14 of the legs 5 and 6 for normally retaining the latter upwardly within the cylindrical members.

The cylindrical member 15 carried by the leg 6 is secured to the longitudinal rod 18 slidably positioned through an eye 19 secured to said leg and pivotally connected at its upper end to one end of a short lever 20 pivotally connected at 21 in a suitable bracket 22 attached to the leg 6 and extending a distance laterally of the latter. The opposite or outer end of the lever 20 is connected with the horizontally disposed bar 13 by a link 23. The other cylindrical member 15 is connected with a rod 24 extending parallel with and in spaced relation to the leg 5 and slidably positioned through an eye 25 carried by the latter. A laterally projecting pin 26 is secured adjacent the upper end of the rod 24 and is slidably mounted within the longitudinally elongated opening 27 formed in the enlarged end of the rod 24. A registering mechanism is inclosed by a suitable casing 28 and is secured laterally of one of the heads 8 and provided in the side adjacent the leg 5 with an elongated opening 29. The upper end of the rod 24 is angularly directed, as indicated at 30, extended into the casing 28 through the opening 29 and operably connected with the registering mechanism, whereby when the rod 24 is moved upwardly relative to the leg 5 the register is operated. The register may be read through a suitable opening 31 provided in the casing 28, as will be understood.

In operation the measuring instrument is placed in the position illustrated in Fig. 1, and swung first upon one leg and then upon the other on a line between two points for measuring the distance between the latter. Each time either of the cylindrical members is engaged against the ground the weight of the legs 5 and 6 and coöperating parts depresses the springs 17 causing the cylindrical members 15 and rods 18 and 24 to move a distance upwardly on the legs 5 and 6, thus operating the register 28 through the angularly directed arm 30 of the rod 24. It will be understood that movement of the cylindrical member 15 and the leg 5 is imparted directly to the register through the single rod connection 24, whereas movement of the cylindrical member 15 of the leg 6 is transmitted to the register through the rod 18, lever 20, link 23, bar 13 and rod 24, the vertically disposed bar or post 11 providing a fulcrum for the bar 13 and permitting sliding movement thereof.

What is claimed as new, is:

1. A registering measuring instrument comprising a pair of angularly directed legs, feet on the free ends of said legs, cylindrical members slidably positioned over said feet, means for normally retaining said cylindrical members in extended position, a register, operable connections between one of said cylindrical members and said register, and operable connections between said first mentioned operable connection and the other cylindrical member.

2. A registering measuring instrument comprising a pair of angularly directed legs, feet on the free ends of said legs, cylindrical members slidably positioned over said feet, means for normally retaining said cylindrical members in extended position, a register secured at the adjacent ends of said legs, a brace connecting said legs at their adjacent ends, a rod connecting one of said cylindrical members with said register, a bar pivotally and slidably supported on said brace and having pivotal connection at one end with said rod, and operable connections between the opposite end of said bar and the other cylindrical member.

3. A registering measuring instrument comprising a pair of angularly directed legs, feet at the free extremities of said legs, cylindrical members slidably positioned over said feet, means for normally retaining said cylindrical members in extended position, a brace connecting said legs intermediate their ends, a register secured on the adjacent ends of said legs, a rod connecting one of said cylindrical members with said register, a standard secured to said brace, a bar pivotally and slidably mounted in said standard and having pivotal connection at one end with said rod, a bracket secured to one of said legs, a lever pivotally mounted in said bracket, a link connecting one end of said lever with said bar, and a rod connecting the opposite ends of said lever with the other cylindrical member.

In testimony whereof I affix my signature in presence of two witnesses.

DIDIER A. LANDAICHE.

Witnesses:
J. A. O. COIGNET,
A. J. TORBERT.

Copies of this patent may be obtained for five cents each, by addressing the "Commissioner of Patents, Washington, D. C."